Nov. 27, 1962
J. B. McGAY ETAL
3,065,594
ESCAPEMENT TIMED FLUID AND SPRING MOTOR
Filed May 1, 1957
2 Sheets-Sheet 2
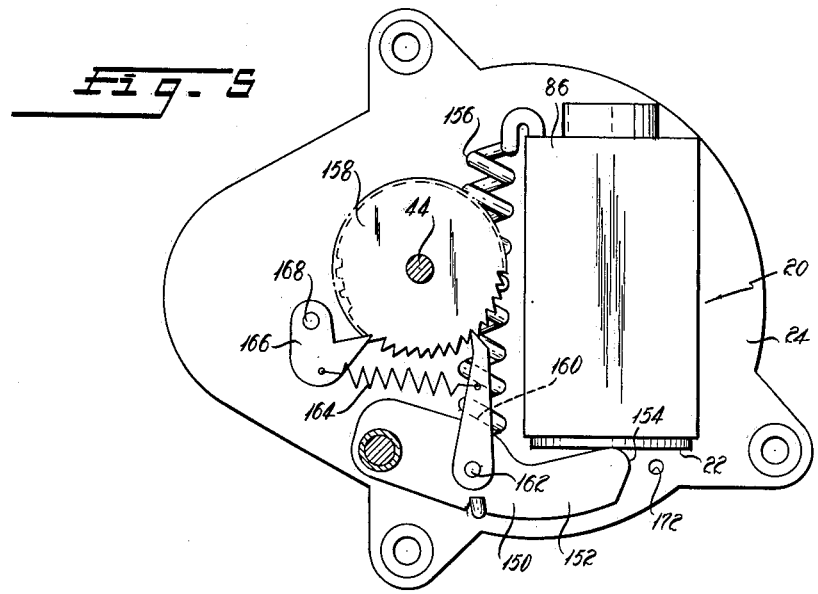
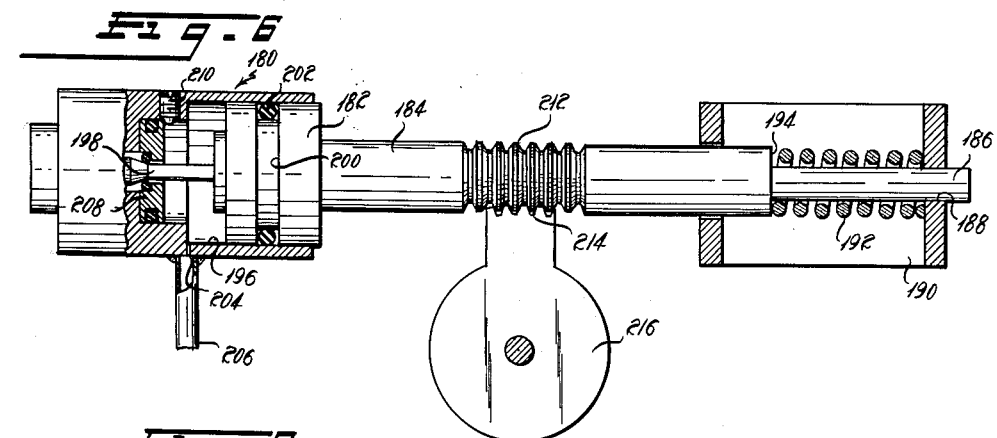
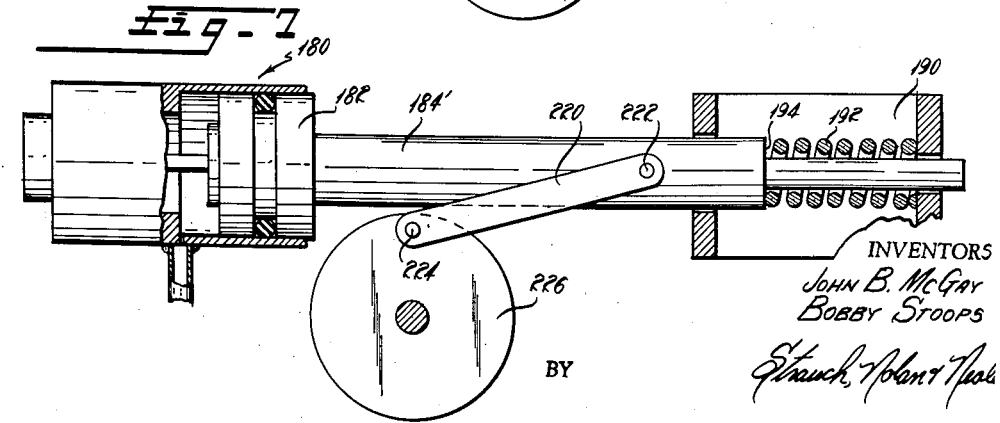
INVENTORS
JOHN B. McGAY
BOBBY STOOPS
BY
ATTORNEYS ated Nov. 27, 1962

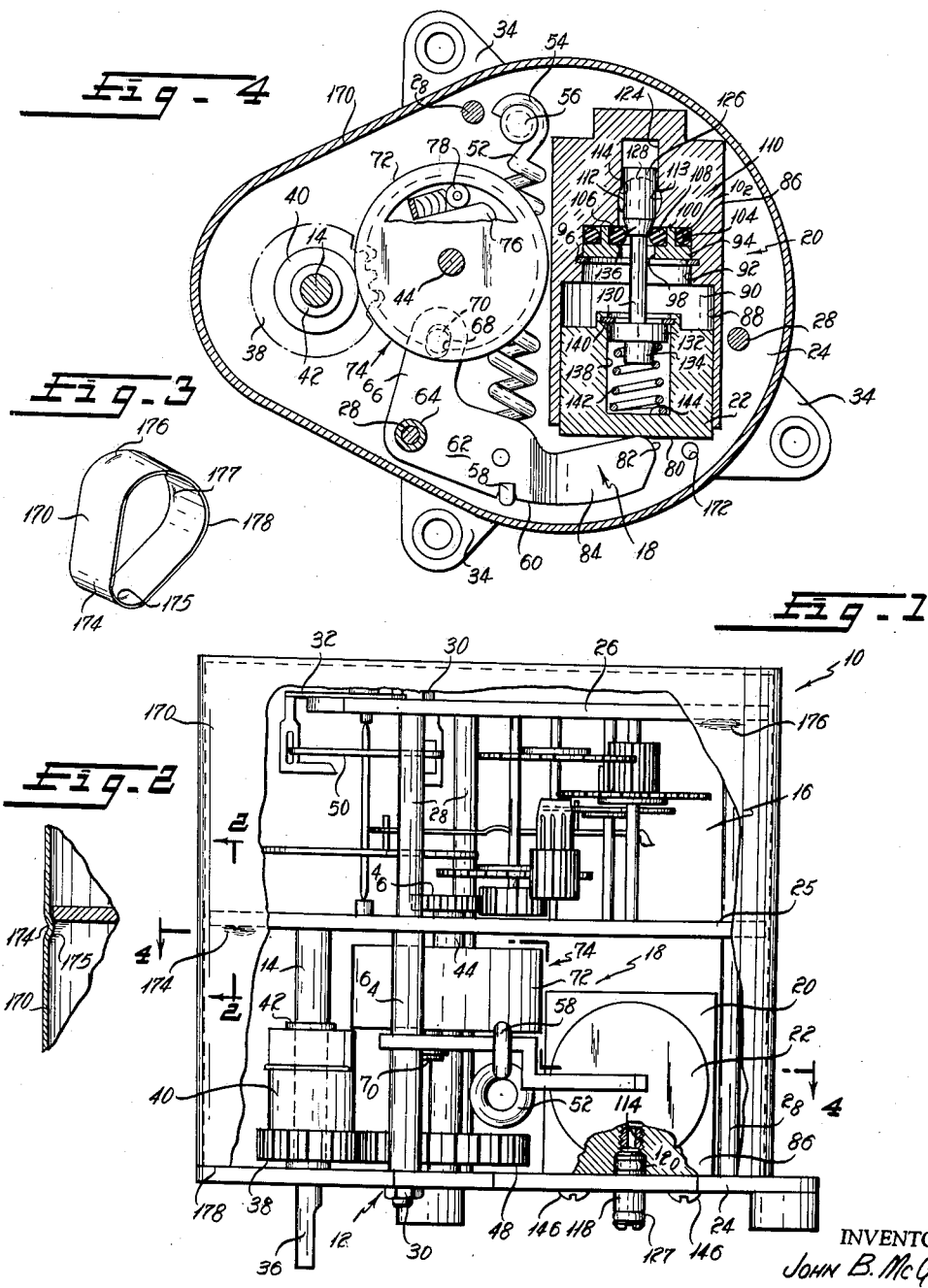

3,065,594
ESCAPEMENT TIMED FLUID AND SPRING MOTOR
John B. McGay and Bobby G. Stoops, Tulsa, Okla., assignors to Rockwell Manufacturing Company, Pittsburgh, Pa., a corporation of Pennsylvania
Filed May 1, 1957, Ser. No. 656,434
22 Claims. (Cl. 60—7)

This invention relates to a pneumatically powered timed drive mechanism and is particularly related to an escapement controlled spring powered drive utilizing intermittent power impulses of an automatically operable, pneumatic motor arranged as a compact unitary device for storing energy in the spring.

The specific embodiments disclosed herein were originated for use as chart drives and derive power from a source of air under pressure or gas, in remote locations, such as much of the uninhabited land over which gas pipe lines are laid, where it is impractical to provide a source of air, electrical or pure mechanical energy, to maintain operation. In the latter case, a relatively small amount of the gas transmitted through an associated large pipe line is diverted to the pneumatic drive which transforms the pressure energy of the gas into spring energy of the timed drive. United States Patents Nos. 2,716,860 and 2,780,911 illustrate prior art pneumatic timed chart drives utilizing impulse power of a pneumatic jet and United States Patent No. 2,254,858 illustrates a rather complex piston powered pneumatic clockwork.

Previously known pneumatic piston powered mechanisms for applying a drive torque to a timed drive device have certain disadvantages resulting from the complexity of parts required for automatic control of the piston reciprocation. Complex valve control elements are conducive to a high rate of breakdown occurrences and hinder assembly and disassembly for repair, cleaning and inspections.

This invention incorporates a unitary pneumatic power component consisting of a cylinder block with a reciprocable piston and internal valving directly cooperating with the piston. The piston is fired in one direction stressing an external spring, closing the internal valve and moving a drive member of a one-way clutch in its free rotating direction. The spring biasing force then returns the piston and moves the one-way clutch member in its driving direction to drive an output shaft controlled by an escapement mechanism. When the escapement has permitted a full return of the piston, the internal valve is automatically opened and the firing process is repeated. The pneumatic power component with integral control valving is removable as a unit enabling great ease in assembly and disassembly for inspection and cleaning. It provides a component where all valve parts and valving control connections are enclosed. The drive can be used where a pressurized air supply is available and can be used with a compressed gas source such as natural gas. It has a very low gas consumption rate. Designed as a small compact unit it will be completely interchangeable with existing electric timed drive motors and, where explosion-proofing is an essential requisite, it eliminates the need and handling of electrical circuitry.

Accordingly, a primary object of this invention resides in the provision of a novel pneumatic powered time drive mechanism having a pneumatic drive which is simple in construction, has few parts and is relatively inexpensive.

Another object resides in the provision of a novel pneumatic powered timed drive mechanism with a unitary automatically operable pneumatic motor unit operable to stress a spring and store energy for rotating a drive shaft under control of an escapement. As an adjunct to this object there is novel cooperative structure between the motor unit, power spring and drive shaft which includes a one-way clutch.

A further object resides in providing a pneumatic motor unit, with a reciprocable drive member and self contained control valving, for use with a drive mechanism wherein extremely rapid reciprocation of the drive member in one direction stresses a spring and closes a control valve, the stored spring force then reacting through the reciprocable member to move it in the opposite direction, which movement gradually increases an opening force on the control valve until the valve snaps open and the foregoing cycle is repeated. A spring biased connection between the reciprocable member and the control valve enables relative movement of the two elements during motor operation.

Still another object resides in providing a compact, novelly covered pneumatic timed drive assembly wherein a cup shaped cover member has integral formations which enable structural cooperation between the cover and support members of the assembly to secure the cover on the assembly.

A still further object resides in the provision of a drive unit comprising a reciprocating piston type pneumatic motor operatively connected to a drive shaft through a unidirectional drive unit and having a power storage spring biasing the piston in one direction, the piston being disposed within a cylinder block and carrying a valve member within the block with a spring biased lost motion connection. The arrangement of the valve member with the motor inlet, its fixed position seat in the block, the force of the biasing spring in the lost motion connection and the pressure of the air supply will result in a force balance on the valve to move it in opening and closing directions thus determining the length of piston stroke.

Further novel features and other objects of this invention will become apparent from the following detailed description, discussion and the appended claims taken in conjunction with the accompanying drawings showing preferred structures and embodiments, in which:

FIGURE 1 is a side elevation illustrating a preferred embodiment of an enclosed timed pneumatic drive mechanism, a portion of the cover being broken away to show component arrangement;

FIGURE 2 is a detail section taken on line 2—2 of FIGURE 1, illustrating the formation of a cover gripping portion and its cooperation with mechanism structure;

FIGURE 3 is a perspective of the assembly cover;

FIGURE 4 is a section taken on line 4—4 of FIGURE 1 illustrating piston and valve details of the pneumatic motor and details of the spring and one-way drive connections;

FIGURE 5 is a view similar to FIGURE 4 illustrating a modified one-way drive connection between the motor and output shaft;

FIGURE 6 is a plan view with partially sectioned components illustrating an alternate arrangement of drive mechanism contemplated for larger drives, the pneumatic motor unit in this instance being sealed and having an orifice bleed and a vent line; and FIGURE 7 illustrates a drive similar to that of FIGURE 6 with an alternate drive linkage between the piston and the one-way drive unit on the output shaft.

A contemplated use of these drive assemblies is for powering condition recording charts and with reference to the drawings for specific details, FIGURES 1, 2 and 4 illustrate the compact drive assembly made in accordance with priciples of this invention and particularly adapted for use as a minature chart drive. The charts which are o be driven by these devices are conventionally, either strip or circular charts which are driven in a timed relationship with a recording device and a use of such charts is to record conditions of flow through pipe lines over desired periods of time. Such charts can be used to provide a permanent record of electrical power flow through various machines or to record the continuing conditions for any factors of which permanent records are desired.

The timed pneumatic powered chart drive of this invention utilizes compressed air or gas to extend a power spring at intervals determined by valving mechanism inside the cylinder block of the pneumatic motor. Power run down of the spring is then controlled by means of a lever type escapement to a chart drive gear train.

The complete drive assembly 10 (FIGURE 1) has a support structure 12 upon which is journalled a driven output shaft 14 which is couple to and the rate of rotation of which is controlled by an escapement mechanism 16, and a pneumatically powered drive mechanism 18 for applying drive torque to output shaft 14 and escapement mechanism 16. Drive mechanism 18 includes a pneumatic motor unit 20 adapted to be coupled to a source of fluid, such as air, under pressure and to convert the pressure energy to intermittent reciprocation of a motor piston member 22.

Support structure 12 is formed by 3 parallel plates 24, 25 and 26 which are held in spaced relationship by shouldered spacer rods 28 and nuts 30. The general outline of the 3 plates is essentially similar to that shown in FIGURE 4, the center plate 25 and upper plate 26 being slightly smaller than lower plate 24, as is shown in FIGURE 1, and the lefthand end of upper plate 26 being cut short at the installation position of a hair spring adjustment lever 32 in the escapement mechanism 16. Lower plate 24 has three projecting ears 34, used to mount the drive assembly 10 on a fixed base. The output shaft 14 projects through and is journalled in lower plate 24 and has its upper end journalled in the center plate 25. The projected end 36 of output shaft 14 is adapted for connection to a component to be driven, for example, a chart sprocket or cable pulley. Between plates 24 and 25, a gear 38 is secured through a coil spring type unidirectional clutch 40 on output shaft 14 and is axially maintained by a spring clip 42 disposed in a suitable groove in the shaft 14. The uni-directional clutch 40 may be omitted if desired but is normally used to provide a safety factor to enable rotation of output shaft 14 independently of the other components of drive assembly 10, as may be desired in some installations. When coil clutch 40 is omitted, gear 38 will be directly fixed to shaft 14 by a set screw or other suitable device.

Approximately centered in FIGURE 1, an arbor 44 is rotatably mounted adjacent its ends between lower plate 24 and center plate 25. The upper end of arbor 44 projects through center plate 25 and has a gear 46 secured thereto as by a press fit. Adjacent the upper side of lower plate 24 a second gear 48 is secured to the lower end of arbor 44 as by a press fit and is so dimensioned to mesh with gear 38 on output shaft 14. Arbor 44, and hence the output shaft 14, is coupled through the upper arbor gear 46 to the escapement mechanism 16, therefore rotation of arbor 44 and output shaft 14 will be in accordance with a timed rate permitted by escapement 16. As hereinbefore noted, the timing of escapement 16 can be adjusted by the lever 32 co-acting with the escapement hair spring 50.

Driving power for arbor 44 is derived from a coil tension spring 52 having one end 54 anchored relative to support structure 12 by a post 56 (FIGURE 4) fixed to lower plate 24. The other end 58 of spring 52 is attached to one arm 60 of a lever 62 which is secured to a sleeve 64 which in turn is journalled for pivotal movement on one of the rods 28 between lower plate 24 and center plate 25. The other arm 66 of lever 62 is provided with a slotted aperture 68 disposed over a post 70 which depends from the lower side of a driving member 72 of a uni-directional clutch 74, of which the driven clutch member 76 is fixedly secured to the arbor 44. Clutch 74 is a miniature roller type over-running clutch. Details of a suitable roller clutch can be ascertained by reference to the E. F. Ayer et al. United States Patent No. 2,633,951.

Viewing FIGURE 4, movement of the lever 62 in a counterclockwise direction under the biasing force of spring 52 will cause the driving member 72 of clutch 74 to rotate clockwise, which rotation through rollers 78 will engage the driven member 76 and cause clockwise rotation of arbor 44, the rate of rotation of arbor 44, as hereinbefore described, being governed by escapement 16. Clockwise pivotal movement of lever 62 against the biasing force of spring 52 will rotate the driving clutch member 72 counterclockwise which releases engagement of rollers 78 and permits a reverse overrunning between driving clutch member 72 and driven clutch member 76. Thus there will be no movement of arbor 44 whenever the lever 62 is moved clockwise against the spring bies. By providing an extremely rapid clockwise pivotal movement to intermittently tension the spring 52, a substantially constant drive force will be realized through the unidirectional clutch 74 to arbor 44 and therefore an essentially constant rotation of output shaft 14 under control of escapement 16 occures.

To provide the rapid intermittent clockwise movement of lever 62 between its pivotal limit positions, the reciprocable piston 22 of the pneumatic motor units 20 has an exposed face 80 which abuts the follower end 82 of an extension 84 on lever arm 60. Motor unit 20 is constructed of a block housing 86, one end of which is formed with an open end cylindrical bore 88 which constitutes a cylinder for the reciprocating piston 22. Note that piston 22 has a free sliding fit in cylinder 88 but there is no seal between the relatively reciprocable surfaces of piston and cylinder. This arrangement results in a minute annular space around piston 22 to provide an intentional slow leakage of operating fluid from the expansible working chamber 90 to the exterior of block 86.

A counterbore 92 is formed at the base of cylinder bore 88 and receives a valve seat retaining ring 94 which is held in place within the counterbore 92 by a snap ring 96. Retaining ring 94 has a central aperture 98 and an axially projecting annular flange 100 which abuts the end wall of counterbore 92. An O-ring 102 is disposed over the outer periphery of the flange 100 and against a shoulder 104 on retaining ring 94, and being slightly distorted between the flange 100 and the cylindrical wall of counterbore 92, provides a fluid tight seal between the valve seat retaining ring 94 and counterbore 92. An inner annular shoulder 106 disposed between flange 100 and retaining ring aperture 98 provides a seat for an inner O-ring seal 108 which constitutes the seat for valve assembly 110.

At the base of counterbore 92 a further small diameter counterbore 112 provides an inlet chamber 113 and extends to intersect an inlet passage 114 which is directed radially to the exterior of block 86, exiting at the lower side of the block as clearly shown in FIGURE 1. The exterior end of passage 114 is counterbored to form a recess seat 116 while the remainder of passage 114 is threaded. This enables a nipple fitting 118, carrying an O-ring seal 120, to be threadedly secured in sealed relation within the inlet passage 114. Nipple 118 projects downwardly through an appropriate hole provided in the lower plate 24 and its projected end carries a second small O-ring 122 which enables a sealed fitting with the end of an air pressure hose (not shown). A still further blind counterbore 124 is formed at the base of inlet chamber 113 and provides a generally guiding co-action with the enlarged end 126 of a movable valve member 128. Shown in FIGURE 4, the relative dimensions between the valve member end portion 126 and the counterbore 124 provide a small annular clearance, yet at the same time enable a guided relationship between block 86 and the movable valve member 128. This small annular space permits valve movement without a fluid lock occurring in blind bore 124. Valve member 128 includes the aforementioned end 126, a stem portion 130, a guide flange 132 adjacent the opposite end and a spring seat boss 134 coaxial with the guide flange 132.

Valve member end 126 has a diameter of larger dimension than the inner diameter of O-ring 108 and the stem 130 has a diameter of smaller dimension than the inner diameter of O-ring 108. The transition between end 126 and stem 130 is a frusto-conical seating surface 136 which engages and seals against the surface of O-ring 108 when member 128 is in the valve closed position. The stem 130 projects through O-ring 108, the aperture 98 in the valve seat retaining ring 94 and co-axially into a counterbore 138 on the inner side of piston 22. In this position, the guide flange 132 on the end of stem 130 is disposed within piston counterbore 138 and is retained for limited movement relative to piston 22 by the retaining ring 140 held in an annular groove adjacent the open end of counterbore 138. A valve spring 142 is disposed in the piston counterbore 138 and is seated over boss 134 on guide flange 132 on the movable valve member 128, thus exerting a biasing force tending to keep movable valve member 128 projected from the piston 22 to a position where flange 132 is engaged against the retaining ring 140. The end of spring seat boss 134 constitutes an abutment which limits the relative telescoping travel of the movable valve member 128 and piston 22 by engagement against the piston end wall 144.

Operation

When the drive assembly 10 is mounted on a chart recording mechanism, the end 36 of output shaft 14 will be connected to chart mechanism input drive member (not shown) and air or a suitable gas will be supplied through a pressure line (not shown) to the drive assembly nipple fitting 118, at a nominal 20 p.s.i. pressure, placing the motor unit inlet chamber 113 under pressure. When the movable valve element 128 is in an unseated position, the pressurized air passes through valve port 98 around valve stem 130 to the motor chamber 90. Resulting pressure increase in chamber 90 causes piston 22 to move outwardly, pushing against the follower end 82 of lever 62 to rock lever 62. During this movement of piston 22, the valve stem guide 132 is engaged by retaining ring 140, pulling valve 128 outwardly until the frusto-conical portion 136 seats against the O-ring seal 108 shutting off the air supply to motor chamber 90. This is a very rapid action and, simultaneously with the firing of piston 22, the pivoting of lever 62 clockwise stresses the power storage spring 52.

As soon as valve 110 closes, piston 22 will immediately start its return movement under action of the power spring 52 through the lever follower end 82. Leakage of the air from motor chamber 90 occurs through the annular clearance between piston 22 and the cylindrical bore 88, allowing the piston 22 to be moved again to a starting position. During return movement of piston 22 the valve 110 remains in closed position, being held by air pressure in chamber 113 and in the counterbore 124, acting on valve element end 126. However, valve spring 142 will be compressed as the piston 22 returns to its initial position, and when the end wall 144 of piston 22 engages the spring retaining boss 124 on the movable valve element 128 or the stress in spring 142 becomes great enough to counteract air pressure on end 126, element 128 will be moved to unseat from the O-ring seal 108 thereby again permitting air under pressure to be admitted to the motor chamber 90. Opening of valve 110 permits the air pressure across the movable valve element 128 to equalize and valve spring 142 will extend to fully open valve 110, rapidly admitting air through the now wide open port 98 into the motor chamber 90, causing piston 22 to again rapidly fire and the aforedescribed intermittent motor cycle will be repeated.

As described, when piston 22 fires, the lever 62 will be pivoted to extend the power storage spring 52. The clutch driving element 72, which is connected to lever 62 through pin 70 and lever arm slot 68, will be rotated in the free wheeling direction around arbor 44. When the piston 22 starts its return stroke, under the force of energy stored in spring 22, the lever 62 also starts a return oscillation of driving clutch member 72 causing rollers 78 to engage the clutch driven member 76 supplying rotational power to the arbor 44 which, being connected through gears 48 and 38 to the output shaft 14 and through gear 46 to the escapement 16, will supply rotational power at a timed rate to drive shaft 14. During the extremely short interval of time when piston 22 is being fired and power is not being applied to arbor 44 through the one-way clutch 74, there is sufficient stored up momentum energy in the gear train to maintain power to the escapement and output so in effect there is no time lag in output shaft rotation.

Firing of piston 22 is a repetitive operation. The cycle time varies with supply air pressure, being shorter for lower pressures and longer for higher pressures. A unit can be designed to operate under pressures within a range, e.g., an approximate range of from 15 to 25 p.s.i., and accuracy of the drive will not be affected by pressure variations within this range. Travel of piston 22 is a also related to supply air pressure and cycle time. The shorter the cycle time, the less the piston travel, as travel is related to the force of valve spring 142, which is necessary to open valve 110 against supply air pressure. It is thus noted that the operating range of the drive has a force-balance relationship. It is therefore possible to vary the air supply pressure, the spring constant of the main spring and the spring constant of the valve spring to effect a change in the range of the drive to suit particular application needs.

Air consumption by this drive assembly occurs only during the firing operation on piston 22 which occurs at intervals governed by the escapement, thus it is readily seen that the power unit has a low air consumption. This is an important feature, particularly in installations where a large number of pneumatic drive assemblies are installed, which feasibly might place a large burden on air supply equipment. Consumption by a single unit, where the diameter of piston 22 is approximately 0.60 inch, will be approximately 0.02 cubic feet per hour.

The pneumatic motor unit 20 can be removed, as a unitary assembly of housing block 86, piston 22 and valve 110, by removing two machine screws 146 which secure block 86 to the bottom plate 24. To disassemble the motor unit, air pressure can be supplied to the inlet nipple 118 and will fire the piston 22 together with the movable valve unit 128 out of the cylinder 88. The valve seat retaining ring 94 with the two O-rings 102 and 108 can be removed by removing snap ring 96 from counterbore 92. Removal of the retaining ring 140 from the piston counterbore 138 will permit separation of the piston 22, the movable valve element 128 and the valve spring 142. This simple disassembly of a minimum number of elements permits complete cleaning or exchange of dirty or damaged motor parts.

Further Embodiments

A variation of the aforedescribed mechanism is illustrated in FIGURE 5. In this embodiment, motor unit 20 with piston 22 is identical with that described relative to the embodiment shown in FIGURES 1 and 4. Lever 150 has an extension 152 with a follower end 154 engaging the outer face of piston 22 and is pivoted on a support rod in the same manner as described for lever 62 however, the short second arm is omitted. A coil power spring 156 has one end anchored to lever 150 and the other end hooks into an anchor hole in the back face of motor unit block 86, this being an alernate installation to the anchor post 56 shown in FIGURE 4. A ratchet wheel 158 is non-rotatably fixed to arbor 44 in lieu of the one-way clutch 74 of FIGURE 4. Ratchet powl 160 is pivotally carried by lever 150 on a stud 162 and is biased into ratcheting engagement with the teeth of ratchet wheel 158 by a spring 164. Ratchet gear 158 is held against reverse rotation during firing of piston 22 by a stop dog 166 pivoted about a stud 168 depending from the center support plate 25. The ratchet pawl spring 164 is anchored to the stop dog 166 thereby biasing both the pawl 160 and stop dog 166 into engagement with the ratchet wheel 158. When the piston 22 is fired, it pushes lever 150 clockwise and ratchets pawl 160 back over the teeth on ratchet wheel 158. As piston 22 starts its return stroke under the force of spring 156, the ratchet pawl 160 engages a tooth on and rotates ratchet wheel 158, thus suppling power through arbor 44 to the output shaft 14 under control of escapement mechanism 16 as in the aforedescribed embodiment.

In each of these embodiments of FIGURES 4 and 5 the escapement mechanism 16 is housed in the space between center plate 25 and upper plate 26 while the motor unit 20 and power drive linkage to the output shaft 14 are housed in the space between lower plate 24 and center plate 25. An integral cup shaped cover 170 (FIGURES 2, 3 and 4) fits over the assembly 10, resting on bottom plate 24. Exhaust air, from the cylinder 88 travels out of the cup-shaped cover through an exhaust hole 172 located in bottom plate 24. In this manner the cover 170 and exhausting air completely protects the chart drive mechanism from ambient dust filled atmospheric air.

Cover 170 has a cross section approximating the pear shaped configuration of lower plate 24 and fits over the upper plate 26 and center plate 25 with essentially a free sliding fit around the periphery of center plate 25 and the righthand periphery of upper plate 26. With reference to FIGURES 1, 2 and 3 it will be seen that two elongate indentations 174 are formed on the exterior of cover 170 a slight distance below where bottom edge of center plate 25 is disposed. The two indentations 174 from inner projections 175 spaced around the small curvature portion of the side of cover 170 and each projection 175 is formed with a sharper break on its upper side than on the lower side. Similar indentations 176 are provided at the righthand side and form inner projections 177 spaced around the large curvature portion of the side of cover 170, immediately below where the lower edge of upper support plate 26 is disposed in assembly. When cover 170 is placed over the assembled unit 10 the lower projections 175 will readily pass to and over the small curvature edge of center plate 25 and the upper projections 177 on the opposite side of the cover 170 will readily pass over the large curvature edge of plate 26 because of the gradual inclination of the lower sides of projections 175 and 177. The inherent resilience of the cover 170 will enable the projections 175 to spring in so their upper edges are under the edge of plate 25 and similarly the projections 177 will spring in with their upper edges under the edge of plate 26. This spring action occurs at the position where the lower edge 178 of cover 170 abuts the upper surface of the lower plate 24. By this means the cover is firmly clamped to the drive unit assembly 10 and there is a snug fit between the open edge 178 of cover 170 and the lower support plate 24. The cover is easy to assemble, has no brackets or screws and yet is very firmly held in place. Cover 170 may be readily removed for any inspection or adjustment by inserting a sharp edged screwdriver between edge 178 and lower plate 24 and giving a twisting action to pry the cover upward so projections 175 and 177 will be forced past respective plates 25 and 26.

A modified form of the motor unit and drive linkage to the unidirectional clutch, as shown in FIGURE 6, is proposed for large chart drive installations. The motor unit 180 is essentially the same as motor unit 20, having an air inlet (not shown) but identical to that of motor 20. Secured to piston 182 is a piston rod 184 having a reduced end extension 186 passing through an aperture 188 in a bracket 190 which serves as a piston rod guide and spring abutment for a power storage spring 192 which is compressed between piston rod shoulder 194 and a portion of bracket 190. In larger installations the power portion and escapement train portion of the drive assembly are generally house in the same space. This, coupled with the fact that larger installations are generally used with gas lines and hence use the gas from the lines, makes it advisable to exhaust the compressed gas, which may have corrosive effects, from piston working chamber 196 to the outside of the chart drive case to prevent contact with any portion of the escapement mechanism. Piston 182 and the movable valve element 198 are interconnected in the same manner as that shown in FIGURE 4, however, piston 182 has an annular groove 200 formed around its cylindrical surface to receive and retain an O-ring 202 and provide a seal between piston 182 and the wall of working chamber 196. Adjacent the inner end of working chamber 196 is a small bleed orifice 204 which permits a slight controlled lead of pressure fluid into an exhaust line 206 passing to the exterior of the drive assembly casing. A modified form of the valve seat retaining ring 208 is illustrated in FIGURE 6, the ring 208 being retained in its counterbore by a set screw 210 rather than a clip ring as in FIGURE 4. However, the seat ring arrangement of FIGURE 4 is the preferred embodiment.

The linear motion of piston rod 184 is changed to rotary motion, for a free wheeling clutch or pawl and ratchet arrangement similar to that shown in FIGURES 4 and 5 respectively, by a series of teeth 212, forming a gear rack on tne piston rod 184, which mesh with mating teeth fixed on or integral with the housing of the driving member 216 of free wheeling clutch 74. When piston 182 fires, the piston rod 184 moves to the right turning clutch driving member 216 in a free wheeling direction and compressing the power spring 192. Power spring 192 then forces the rod 184 and piston 182 to the left causing power to be applied through the clutch 74 by the clutch driving member 216. Using a round piston rod 184, the rack teeth, piston rod and piston can be machined in one operation on automatic screw machines and furthermore the piston 182 and rod 184 can rotate while in operation without affecting the operation of the meshed teeth of the rack and gear. This eliminates the problem of alignment during assembly or in operation which occurs when rack teeth are cut on flat surfaces.

As an alternate design for large installations, the embodiment of FIGURE 7 shows the rack and gear teeth replaced by a link 220 which is attached to rod 184' by a pivot pin 222. Link 220 has its other end pivotally attached by a pin 224 to a driving member 226 of a unidirectional clutch similar to clutch 74 in FIGURE 4. Action of this embodiment is substantially identical to that of the FIGURE 6 embodiment.

The foregoing description discloses the structure of a miniature pneumatic timed drive assembly which is particularly useful in strip chart recording instruments. The drive assembly is operable by the pressure of an air supply or gas supply source. It has a completely integral motor unit with internal valving. The drive assembly has been designed to be completely interchangeable with electric drive motors, which have mounting and limiting configuration dimensions standardized. The air powered drive has particular application where explosion proofing is essential, as it eliminates electrical circuitry. The unique cover and cover clamped structural cooperation with the drive assembly support structure provides an easily assembled and disassembled unit requiring no extra attachment brackets between the cover and the drive assembly. A sealed embodiment is disclosed to enable use of a drive mechanism where gas is being measured or controlled and is used as the source of power. In such sealed unit the power source gas which may be corrosive is not permitted to come into contact with the escapement mechanism of the assembly. Although it may be necessary to further regulate and/or condition the gas to remove moisture or dirt the drive will allow continued operation of the attached instruments by a timed mechanical drive without the previously necessary periodic winding of the mainspring of prior art instrument drives.

The invention may be embodied in other specific forms without departing from the spirit or essential characteristics thereof. The present embodiment is therefore to be considered in all respects as illustrative and not restrictive, the scope of the invention being indicative by the appended claims rather than by the foregoing description, and all changes which come within the meaning and range of equivalency of the claims are therefore intended to be embraced therein.

What is claimed and desired to be secured by United States patent is:

1. A fluid powered timed drive comprising: an escapement mechanism; an output shaft; a rotatable input member; a unidirectional instantaneously coupling drive means, having as its driving member said input member, drive coupled to said escapement mechanism and to said output shaft so rate of rotation of said input member in driving direction and rate of rotation of said output shaft will be controlled by said escapement mechanism; a unitary fluid motor unit with a reciprocable power member and contained power fluid control means responsive to position of said reciprocable power member; power storage means operatively coupled for action by and reaction against said reciprocable power member for intermittent storage of energy upon power member reciprocation in one direction; and means operatively coupling said power storage means to impart a rotational force to said input member in a direction to drive said output shaft.

2. A timed fluid powered drive mechanism comprising: an output shaft; an escapement mechanism coupled thereto; a power storage means; means operatively coupling said power storage means to impart a rotational force to said output shaft; a power unit for automatically intermittently and alternatively furnishing energy to and receiving energy from said power storage means comprising a cylinder, a piston reciprocable therein, one side of said piston cooperating with portions of said cylinder to define an expansible working chamber and the other side of said piston being operatively coupled to said power storage means; a fluid inlet to said cylinder; and fluid flow control means including a restricted flow outlet from said cylinder and valving means cooperating between said piston, said cylinder and said inlet for controlling fluid pressure in said cylinder to enable alternative piston reciprocation under energy of pressurized fluid and energy from said power storage means, said valving means including a movable valve closure member having a spring loaded operative connection to said piston to permit relative movement of said piston and said closure member when said valve is closed and conjoint movement of said piston and said closure member when said valve is open.

3. A timed fluid powered device as defined in claim 2, wherein conduit means communicates with said restricted flow outlet to provide passage for exhaust fluid to a location away from the drive and escapement structure.

4. A timed fluid powered drive mechanism as defined in claim 2, wherein said restricted flow outlet comprises a predetermined bleed from said expansible working chamber.

5. A timed fluid powered drive mechanism as defined in claim 2 wherein means on said cylinder and said piston enable said valve closure member to be guided between said cylinder and said piston for movement parallel to the path of movement of said piston.

6. A timed fluid powered device as defined in claim 2 wherein the relative dimensions of the outer cylindrical surface of the piston and the inner cylinder surface provide a slight clearance constituting said restricted flow outlet.

7. A timed fluid powered device as defined in claim 2 wherein a fluid seal means is provided between said piston and said cylinder and said restricted flow outlet comprises bleed means including an orifice of predetermined size through the cylinder wall adjacent the inlet end of said cylinder.

8. A timed fluid powered device as defined in claim 7 wherein a conduit communicates with said orifice to provide passage for the exhaust fluid to a location away from the drive and escapement structure.

9. In combination, a timed fluid drive assembly having a support with a base plate, an intermediate plate, an upper plate; escapement mechanism mounted between said intermediate plate and said upper plate; a drive mechanism mounted between said base and intermediate plates comprising an output member coupled to said escapement mechanism, a power storage device coupled to said output member and a unitary fluid motor device with self contained valving means operatively engaged with said power storage device to furnish power thereto and receive power therefrom; and a cup shaped cover disposed over said upper and intermediate plates having its peripheral edge abutting said base plate in an essentially snug manner, the side walls of said cover including internal projections shaped to readily pass the peripheral edge of at least one of said intermediate or upper plates in assembly of said cover and firmly gripping under the edges of said gripped plate to resist disassembly.

10. A fluid drive assembly as defined in claim 9, wherein said cover includes a group of internal projections near one side of the cover to grip under said upper plate and a group of internal projections on the opposite side of the cover to grip under said intermediate plate.

11. A fluid powered drive unit comprising: a rotatable member; a unidirectional instantaneously coupling drive mechanism including a spring biased wedging roller type one-way clutch device operatively connected to said rotatable member; a resilient power storage means operatively connected to urge said drive mechanism in a direction to drive said rotatable member; and a unitary automatically operable expansible chamber fluid motor unit with an operating fluid control mechanism contained in and engaging opposite end portions of the expansible chamber and a reciprocable power member operatively engaged with said drive mechanism to move said drive mechanism in a free-wheeling direction and to store energy in said power storage means upon reciprocation in one direction and utilizing reaction force of said power storage means for reciprocation in the opposite direction.

12. A fluid powered drive unit comprising: an oscillatable member; a unitary automatically operable expansible chamber fluid motor unit with a fluid inlet to the expansible chamber, a constant bleed outlet from said chamber, an operating fluid control mechanism contained in portions of the expansible chamber and a reciprocable power member; said fluid control mechanism comprising a valve closure member and a ring seat enabling control of inlet fluid to said chamber, said closure member having means enabling inlet fluid pressure to create a force on said closure member tending to maintain said closure member on said ring seat only when said closure member is seated on said ring seat; a power storage spring operatively connected to said reciprocable power member to exert a resilient bias on said reciprocable power member in a direction opposite to the direction of fluid motor force exerted on said reciprocable power member; and means providing an operative connection between said reciprocable member and said oscillatable member whereby said reciprocable members moves in one direction under fluid power to oscillate said oscillatable member in one direction and store energy in said power storage spring and reaction force of said power storage spring moves said reciprocable member and oscillatable member in their respective opposite directions.

13. A fluid powered drive unit as defined in claim 12, wherein said expansible chamber motor unit has a cylinder with one open end and includes, as said reciprocable power member, a piston with a piston rod projecting from its open face; guide means are provided for said rod; said power storage spring engages said rod and said guide means to bias said piston into said cylinder; and said means providing an operative connection includes linkage connecting said rod and said oscillatable member to change linear motion to angular motion.

14. A fluid powered drive as defined in claim 13, wherein said piston and said rod are unitarily rigid and coaxial; said rod being cylindrical and a portion of the rod cooperating with said guide means being reduced in diameter to provide a shoulder; said spring being a coil compression spring encircling the reduced diameter portion of said rod and seated between said shoulder and said guide means; and said linkage comprises a rack formed by annular grooves and lands in said rod and a gear sector connected to said oscillatable member.

15. A fluid powered drive unit as defined in claim 12, including a support therefor and wherein said expansible chamber motor unit has a cylinder with one open end and a piston reciprocable therein with its outer face constituting an abutment surface, said piston being said reciprocable member; and means providing a connection between said reciprocable member and said oscillatable member being a pivoted lever having an arm disposed against said abutment surface; and said power storage spring being connected at one end to said lever and anchored through the other end to said support to bias said lever arm against said abutment surface.

16. A fluid motor unit for use with a resilient power storage means comprising a unitary automatically operable power unit with outlet means, a self contained inlet means and with valving control mechanism between said inlet means and said outlet means and a reciprocable power member operatively engaged with said power storage means to store energy in said power storage means upon reciprocation in one direction and utilizing reaction force of said power storage means for reciprocation in the opposite direction, said valving mechanism comprising an internal annular seat, a movable valve closure member adapted to move to and from abutment seating on said internal seat with means guiding said valve closure member in a straight path relative to said reciprocable member and resilient means biasing said two members toward one limit position and permitting relative movement against resilient bias toward another limit position.

17. A unidirectional powered fluid motor unit with fluid inlet means and fluid outlet means, comprising: a unitary housing block having a cylindrical bore with one open end and an end wall at the opposite end; an inlet chamber in said end wall with a passage through said block from the inlet chamber to the exterior; a counterbore provided in the cylindrical bore end wall between said inlet chamber and said bore; annular valve seat means in said end wall providing fluid communication between said inlet chamber and said cylindrical bore comprising a retaining ring disposed in said bore, a large diameter O-ring seal between said retaining ring and said counterbore, and a small diameter O-ring retained by said retaining ring in coaxial relation to the retaining ring aperture against the shoulder of said counterbore; movable valve closure means having a first portion disposed to move in said inlet chamber to and from an abutment seating position on said valve seat means and a second portion adapted to project through said valve seat means, said first portion of said valve closure means having a diameter larger than the inner diameter of said small O-ring and said second portion includes a stem, of smaller diameter than the inner diameter of said small O-ring, adapted to be shifted to project through said small O-ring to shift said first portion away from said valve seat means; a piston reciprocable in said bore; and means resiliently connecting said second valve closure portion to said piston; the open end of said bore enabling the application of an external force on said piston for moving said piston into said bore.

18. A fluid motor unit as defined in claim 17, wherein said retaining ring is held in said counterbore by a spring clip and the retaining ring aperture has a diameter slightly larger than that of said first portion of said valve closure means.

19. A unidirectionally powered fluid motor unit with fluid inlet means and fluid outlet means, comprising: a single piece unitary housing block having a cylindrical blind bore extending from one end to an end wall at the opposite end and an inlet chamber constituting a portion of said fluid inlet means, in said end wall coextensive with said cylindrical bore; said fluid inlet means also comprising a passage means through said block at said opposite end from said inlet chamber to the exterior; annular valve seat means in said end wall enabling fluid communication in a direction substantially parallel to the axis of the bore between said inlet chamber and said cylindrical bore; movable valve closure means having a first portion with clearance relative to the walls of said inlet chamber disposed to move substantially wholly within said inlet chamber to one position away from seating engagement on said valve seat means and to a second position providing an abutment seating engagement on the inlet chamber side of said valve seat means, and a second portion adapted to be projected through said valve seat means to control movement of said first portion to both its seated and unseated position; a piston reciprocable in said bore to thereby provide between said piston and said end wall, an expansible chamber, said one end of said blind bore enabling the application of an external force on said piston for moving said piston into said bore; said outlet means comprising a restricted flow outlet from said expansible chamber; and means resiliently connecting said second valve closure portion to said piston for reciprocation of said second valve closure portion in response to piston reciprocation.

20. A fluid motor unit as defined in claim 19, wherein said means resiliently connecting said second portion of said valve closure means to said piston comprises a blind bore in the working face of said piston; a stop means on the end of said second valve closure portion disposed for limited reciprocation in said piston blind bore; means adjacent the open end of said piston blind bore engageable with said stop means to limit movement of said valve closure means away from said piston and a resilient means in said piston blind bore biasing said valve closure means away from said piston.

21. A fluid motor as defined in claim 19 wherein a seal means is provided between the cooperating piston and cylinder surfaces and said restricted flow outlet comprises an orifice bleed provided in the housing block from the end of the cylinder bore adjacent said end wall to the exterior of the block.

22. A unidirectionally fluid powered drive unit with fluid inlet means and fluid outlet means, comprising a cylindrically blind bored single piece cylinder and valve block; a piston reciprocable in the bore of said block to form with said blind bore an expansible chamber; said inlet means including an inlet passage in the blind end of said block; and valve means in the blind end of said block between said inlet and expansible chamber having a valve chamber in communication with said inlet passage, a valve seat between said valve chamber and said valve bore, a valve closure member within said valve chamber having a differential area subjected to the pressure of fluid in said chamber to provide a differential force tending to urge said closure member toward said bore and seating disposition on said valve seat and valve closure operator means resiliently connected to said piston to enable controlled fluid inlet to said chamber dependent upon piston position.

References Cited in the file of this patent

UNITED STATES PATENTS

| | | | |
|---|---|---|---|
| 1,063,168 | Whitney | May 27, | 1913 |
| 2,071,851 | Mustin | Feb. 23, | 1937 |
| 2,254,858 | Reutter | Sept. 2, | 1941 |
| 2,279,427 | Walsh | Apr. 14, | 1942 |
| 2,292,499 | Walsh | Aug. 11, | 1942 |
| 2,319,608 | Kraut | May 18, | 1943 |
| 2,447,311 | Burt | Aug. 17, | 1948 |
| 2,447,312 | Burt | Aug. 17, | 1948 |
| 2,624,424 | Kliewer | Jan. 6, | 1953 |
| 2,630,181 | Solum | Mar. 3, | 1953 |
| 2,631,573 | Levitt et al. | Mar. 17, | 1953 |
| 2,643,644 | Way | June 30, | 1953 |
| 2,668,518 | White | Feb. 9, | 1954 |
| 2,716,860 | McGay et al. | Sept. 6, | 1955 |
| 2,758,569 | Peterson | Aug. 14, | 1956 |
| 2,779,152 | Flagiello | Jan. 29, | 1957 |

FOREIGN PATENTS

| 896,929 | Germany | Nov. 16, 1953 |
|---|---|---|

UNITED STATES PATENT OFFICE
CERTIFICATE OF CORRECTION

Patent No. 3,065,594            November 27, 1962

John B. McGay et al.

It is hereby certified that error appears in the above numbered patent requiring correction and that the said Letters Patent should read as corrected below.

Column 2, line 71, for "minature" read -- miniature --; column 3, line 17, for "couple" read -- coupled --; line 73, for "betwen" read -- between --; column 7, line 4, for "powl" read -- pawl --; column 8, line 11, for "house" read -- housed --; line 25, for "lead" read -- leak --; column 10, line 73, for "members" read -- member --; column 11, line 29, for "and" read -- the --.

Signed and sealed this 24th day of September 1963.

(SEAL)
Attest:

ERNEST W. SWIDER
Attesting Officer

DAVID L. LADD
Commissioner of Patents